United States Patent

[11] 3,593,041

[72] Inventor Labarre, Pierre
St. Bruno, Canada
[21] Appl. No. 763,151
[22] Filed Sept. 27, 1968
[45] Patented July 13, 1971
[73] Assignee RCA Corporation

[54] DIFFERENTIAL PHASE DISTORTION COMPENSATOR FOR COLOR TELEVISION EQUIPMENT
8 Claims, 4 Drawing Figs.

[52] U.S. Cl. .......... 307/262, 178/5.4, 328/155, 307/295
[51] Int. Cl. .......... H03b 3/04
[50] Field of Search .......... 328/155; 333/28; 307/262

[56] References Cited
UNITED STATES PATENTS

| | | | |
|---|---|---|---|
| 2,236,134 | 3/1941 | Gloess .......... | 333/28 |
| 2,606,966 | 8/1952 | Pawley .......... | 333/28 |
| 2,776,410 | 1/1957 | Guanella .......... | 333/28 |
| 2,852,751 | 9/1958 | Lundry .......... | 333/28 |
| 2,958,831 | 11/1960 | Clark .......... | 328/155 |
| 3,315,170 | 4/1967 | Baker .......... | 178/5.4 |

*Primary Examiner*—Forrer, Donald D.
*Assistant Examiner*—Harold A. Dixon
*Attorney*—Edward J. Norton

ABSTRACT: A circuit to compensate for differential phase distortion in color television equipment, that is, to compensate for the undesired phase shift of the color subcarrier information in television equipment due to variation in amplitude of the luminance signal.

Figures 1, 2, 3, 4:
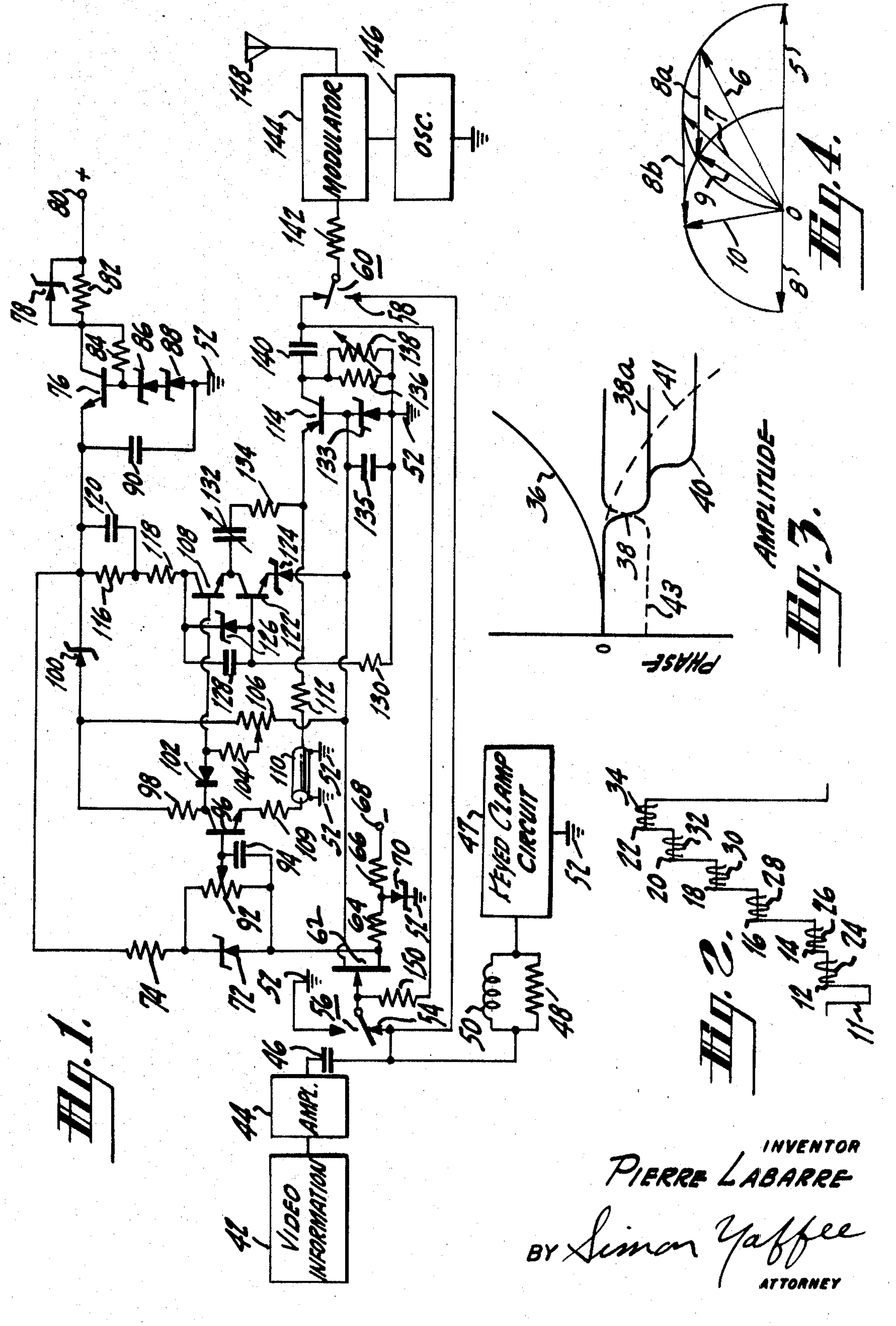

INVENTOR
PIERRE LABARRE
BY Simon Yaffee
ATTORNEY

DIFFERENTIAL PHASE DISTORTION COMPENSATOR FOR COLOR TELEVISION EQUIPMENT

BACKGROUND

In color television equipment, the luminance of a colored element of a picture is determined by the amplitude of a corresponding luminance signal. The saturation or amount of color of the picture element is determined by the amplitude of a subcarrier signal consisting of a color information oscillation. The hue or tint of the element is determined by the phase relationship between the subcarrier and a reference burst of oscillations called the color burst. The color information is superimposed on the luminance signal, whereby the same color information may exist at different levels of luminance of the picture. The transmitter and the receiver act as variable phase shifters due to such factors as stray capacity, the change in resistance of the signal path, and unintentional phase modulation, in the transmitter or the receiver or both during normal operation. Therefore, as the luminance signal varies in amplitude, the color information varies in phase with respect to the color burst, whereby as an element of the picture varies in brightness the hue of the element will change unintentionally. This undesired color change is called differential phase distortion.

Summary

In accordance with the invention, the phase of the color subcarrier is predistorted in such a manner as to neutralize the differential phase distortion, at least to a degree whereby the total differential phase distortion is within acceptable limits, this predistortion being accomplished without varying either the luminance signal or the amplitude component of the color signal. This predistortion comprises varying the phase of the color information in accordance with the instantaneous amplitude value of the accompanying luminance signal and in a direction opposite to the undesired variation in phase produced in the equipment, without changing the amplitude of either the color subcarrier or the luminance signal. This predistortion may be accomplished in the transmitter equipment whereby the transmitted wave includes no objectionable differential phase distortion, or it may take place in the receiver to compensate for the differential phase distortion present in the receiver or the predistortion may be accomplished in both the transmitter and the receiver. Or, if it is known what type of phase distortion will be present in the receivers serviced by a particular transmitter, predistortion may be provided in the transmitter that will tend to overcome not only the differential phase distortion in the transmitter but also in the receivers serviced thereby.

DESCRIPTION

The invention will be better understood when the following description is read in connection with the accompanying drawing in which:

FIG. 1 is a diagrammatic showing of the video portion of a color television transmitter including an embodiment of this invention, and FIGS. 2, 3 and 4 are curves which are useful in explaining the operation of the invention.

Turning first to FIG. 2, FIG. 2 represents the color information at a television receiver for one line of the picture. The reference numeral 11 represents the sync pulse, the reference character 12 represents the back porch of the sync pulse, and the steps 14, 16, 18, 20 and 22 represent increasing luminance or brightness of the picture. The burst of oscillations 24 is the color reference burst of oscillations, and the oscillations 26, 28, 30, 32 and 34, which are imposed on the luminance steps 14 to 22 respectively, are the color information. The color hue or tint of any small portion of a picture is determined by the instantaneous phase difference between the color information (26 for example) and the color burst 24. Therefore, assuming that all the oscillations 26, 28, 30, 32 and 34 are of the same phase, the diagram of FIG. 2 represents a received wave that will cause the presentation of one line of unvarying color (red for example) to appear across the face of the picture, the brightness or luminance however of the unvarying color varying in accordance with the amplitude of the luminance steps 14 to 22. A complete raster built up of lines such as the one represented in FIG. 2 would include parallel vertical bars that vary from deep red to light pink for example. However, as the luminance level increases from 14 to 22, the phase of the color information 26 to 34 respectively, which is imposed on the top of the steps 14 to 22 may, for example, vary in a manner such as the curve 36 shown in FIG. 3. That is for low levels of the luminance signal, the phase of the color information may not be disturbed, while at other luminance levels, an unwanted phase shift of the subcarrier may occur. This form of distortion is called differential phase distortion. Due to this change in phase even though constant phase color information was applied on the luminance signal at the input to the transmitter, the phase relation of the color information oscillations 26, 28, 30, 32 and 34 would vary with respect to the color burst 24 and the several bars appearing on the face of the picture tube comprising part of the television receiver would not be of the same color. The present invention provides, for example, at the television transmitter for the predistortion of the phase of the color information depending on the instantaneous value of the video signal in a manner shown by the curve 38 and 38*a* of FIG. 3, whereby the differential phase distortion is greatly reduced. As will be pointed out, the predistortion may take the shape of the curves 38 and 38*a* or may be a combination of the curves 38 and 40. A smooth variation of the predistortion of phase with changing amplitude, as shown by the dotted curve 41, may be provided.

Turning to FIG. 1, video information in electrical form appears at the output of the equipment represented by the rectangle 42. The AC component of this information may be applied to an amplifier 44 and then through a blocking capacitor 46 to one contact 54 of a single pole double throw switch 56. A resistor 48 shunted by an inductor 50 is connected between the contact 54 and a keyed clamp circuit 47 which connects the switch point 54 to ground 52 for a short time during each line of the television picture to assure that the back porch portion 12 of the television line signal be at ground level in each successive line of the picture. The resistor 48 and the inductor 50 present a high impedance to the color burst, leaving it unaffected by the clamping action that is provided by the clamp circuit 47 during the existence of the color burst. The other contact of the switch 56 is connected to ground 52. The contact 54 is also connected to a contact 58 of a switch 60.

The moving element of the switch 56 is connected to the gate of a field effect transistor 62, whose source is connected through two resistors 64 and 66 in series to a negative terminal 68 of a source (not shown) of operating potential. The junction of the resistors 64 and 66 is connected to the anode of a Zener diode 70 whose cathode is connected to ground 52. The source of the transistor 62 is also connected to the anode of a Zener diode 72, whose cathode is connected through a resistor 74 to the emitter of a voltage regulating NPN transistor 76. The collector of the transistor 76 is connected to the anode of a Zener diode 78, the cathode of the diode 78 being connected to the positive terminal 80 of a source of potential (not shown). A resistor 82 is connected between the anode and cathode of the Zener diode 78. The base of the transistor 76 is connected to its collector by a biasing resistor 84, and to ground 52 by way of two Zener diodes 86 and 88 in series. A storage or filter capacitor 90 is connected between the emitter of the transistor 76 and ground 52.

A potentiometer resistor 92 is connected across the Zener diode 72. The slider of the potentiometer 92 is connected through a capacitor 94 to the source of the transistor 62 and directly to the base of a NPN transistor 96. The collector of the transistor 96 is connected by way of a resistor 98 to the anode of a Zener diode 100 whose cathode is connected to the emitter of the transistor 76. The collector of the transistor 96 is also connected to the cathode of a diode 102, the anode of the diode 102 being connected through a resistor 104 to the slider of a potentiometer 106 and directly to the base of a NPN transistor 108. The potentiometer resistor 106 is connected between the junction of the resistor 98 and the Zener diode 100 and the drain of the transistor 62. The emitter of the transistor 96 is connected by way of a resistor 109, the center conductor of a concentric conductor which acts as a delay line 110 and a resistor 112, connected in the order named, to the emitter of a PNP transistor 114. Each end of the outer conductor of the delay line 110 is connected to ground 52.

The junction of the diode 100 and the emitter of the transistor 76 is connected by way of two resistors 116 and 118 in series to the collector of the transistor 108. The resistor 116 is by passed by a capacitor 120. The emitter of the transistor 108 is connected to the collector of a NPN transistor 122, whose emitter is connected to the cathode of a Zener diode 124. The anode of the diode 124 is connected to the drain of the transistor 62 and to the base of the transistor 114. The collector of the transistor 108 is connected to the cathode of a Zener diode 126 whose anode is connected to the base of the transistor 122. A bypass capacitor 128 is connected across the diode 126. The base of the transistor 122 is connected by way of a resistor 130 to ground 52. An adjustable phasing capacitor 132 and a resistor 134 are connected in series between the junction of the emitter of the transistor 108 and the collector of the transistor 122 and the emitter of transistor 114.

The base of the transistor 114 is connected to the cathode of a Zener diode 133, whose anode is connected to ground 52. The diode 133 is bypassed by a capacitor 135. The collector of the transistor 114 is connected to ground by two resistors 136 and 138 in parallel, the resistor 138 being adjustable. The collector of the transistor 114 is also connected to the other contact of the switch 60 by way of a blocking capacitor 140. The moving contact of the switch 60 is connected through a resistor 142 to an input of a modulator 144. The output of an oscillator 146 is connected to the other input of the modulator 144, the output of the modulator 144 being connected to an antenna 148. The moving element of the switch 54 is connected by way of a resistor 150 to the junction of the capacitor 140 and the contact of the switch 60.

Before explaining the operation of this predistortion circuit, it may be helpful to explain broadly, by reference to the curve of FIG. 4, the operation of an RC phase shifter of the type embodied in the circuit of FIG. 1. If a voltage wave of a given amplitude, represented by the vector 5, is applied across a phase shifter comprising a capacitor and a resistor in series, and the capacitor value is decreased, the voltage across the resistor will decrease and the phase relation between the wave appearing across the resistor and the wave applied to the phase shifter will increase in a known manner, see the vectors 6 and 7. That is, the voltage 6 or 7 across the resistor included in the phase shifter will be less than the voltage 5 applied across the phase shifter as long as the phase shifter provides a phase shift, this voltage 6 or 7 across the resistor decreasing as the phase shift is increased. However, if a voltage wave **8*a* or 8*b* which is 180° out of phase with the wave 5 that is applied to the phase shifter and which is one-half of the amplitude of the applied wave 5 is vectorially combined with the phase shifted wave 6 or 7 appearing across the resistor comprising part of the phase shifter, then no matter how much phase shift is produced by the phase shifter, the resultant wave 9 or 10 will be one-half the amplitude of the wave 5 applied to the phase shifter and will have a phase relationship therewith depending on the adjustment of the capacitor comprising part of the phase shifter. The vectorial indication of FIG. 4 applies whether one considers voltage vectors, as discussed hereinabove, or current vectors as will be discussed in relation to FIG. 1**.

In the position of the switches 56 and 60 as shown in FIG. 1, the signal appearing at the output of the amplifier 44 is processed by the differential phase compensator in a manner to be described. In the alternate position of both switches 56 and 60, the output of the amplifier 44 is applied through the switch 60 and the resistor 142 to the modulator 144 and the input of the differential phase compensator is connected to ground 52 and therefore is not used.

The elements 76 to 90 act as a voltage regulator. The dissipation of energy in the resistor 82 subtracts from the dissipation of energy in the transistor 76 for light loads on this regulator. However, the voltage drop across the resistor 82 rises to the point where the Zener diode 78 breaks down and shunts the resistor 82 for high loads on the described regulator whereby the regulator comprising elements 76 to 90 supplies a regulated voltage to a great variety of loads and yet permits using a smaller transistor 76 than would be required in the absence of the resistor 82 and diode 78. The regulated voltage appearing at the emitter of the transistor 76 causes break down of the Zener diodes 100 and 133. Breaking down of the diode 133 keeps the voltage on the drain of the transistor 62 substantially constant. Therefore, the transistor 62 is a high input impedance, low amplification, source follower amplifier.

In the position of the switch 56 as shown, the voltage wave appearing at the output of the amplifier 44 and applied through the capacitor 46 to the switch terminal 54, which may look like the voltage wave of FIG. 2, is applied to the gate of the field effect transistor 62. In a known manner, the video information applied by way of the capacitor 46 to the contact 54 is clamped to ground once each line, during the back porch interval, by the keyed clamp circuit 47, whereby the back porch 12 is held at ground potential. The color burst present on the back porch is unaffected by the clamping action due to the action of the resistor 48 and the inductor 50 as noted above. The DC portion of the signal is altered in the differential phase compensator to be described and is restored to the output signal, as will be explained, by the connection including the resistor 150.

The Zener diode 72 is also broken down by the voltage applied thereto from the described regulator. Due to the action of the Zener diode 72, both ends of the potentiometer 92 vary in voltage together as the source of the transistor 62 varies. Therefore, varying the position of the slider of the potentiometer resistance 92 does not vary the signal voltage applied to the base of the transistor 96, the position of the slider determining the bias current for the transistor 96. The capacitor 94 is provided to swamp out any distributed capacity present in the resistor 92 and in the circuitry involved with and including the base of the transistor 96. Signals appearing at the source of the transistor 62 are therefore applied to the base of the transistor 96.

When the diode 102 is conducting, as explained below, the transistor 96 acts as a phase splitter. The signal voltage appearing at the emitter and collector of the transistor 96 are equal in amplitude but opposite in phase due to the fact that the sum of the resistors 109 and 112 connected to the emitter of the transistor 96 is equal to the effective resistance of the resistors 98, 104 and 106 and of the input impedance of the transistor 108 which are connected to the collector of the transistor 96. When the diode 102 is not conducting, the voltage at the collector of the transistor is not used.

The diode 102 acts as a threshold device. By manipulation of the slider of the potentiometer 106, the voltage on the anode of the diode 102 can be made more negative than the voltage on the cathode thereof, whereby, for any signal that appears on the cathode of the diode 102 that is insufficient to overcome this back bias, the diode 102 is nonconductive and this insufficient voltage does not get through to the base of the transistor 108. However, all voltages appearing at the emitter of the transistor 96 generate corresponding currents, in resistors 109 and 112, which in turn are fed to the emitter of the transistor 114 without substantial phase change. Two resistors 109 and 112 are used as load resistors for the emitter of the transistor 96 rather than one resistor which would be the sum of these two resistors, since the delay line 110 is necessary to equalize the delay of the signal in the path from the emitter of the transistor 96 to the emitter of the transistor 114 to the delay of the signal in the path from the collector of the transistor 96 to the emitter of the transistor 114. Since the delay line 110 must be terminated in its characteristic impedance to prevent reflection therein, the resistor 112 is chosen to be of the correct size to terminate the delay line 110 and the remainder of the load resistance for the emitter of the transistor 96 is supplied by the resistor 109. The current flow from the emitter of the transistor 96 to the emitter of the transistor 114 corresponds to the vector 8 or 8*a* or 8*b* in FIG. 4.

The portions of the signal, present at the collector of the transistor 96, which overcome the back bias applied to the diode 102 are applied to the base of the transistor 108. The transistors 108 and 122 together with their connections comprise a low output impedance amplifier which operates as follows. If the load on this amplifier is light (as at 60 cycles per second whereby the reactance of the capacitor 132, which is made very small, is high), signal current flowing into the load is low. When the frequency of the input signal applied to the base of the transistor 108 is high, the impedance of the capacitor 132 is low and the signal current drawn thereby increases. The collector current for the transistor 108 increases and the voltage variation on the collector of the transistor 108 increases correspondingly. The variation in voltage on the collector of the transistor 108 is applied to the base of the transistor 122 through the broken down Zener diode 126 and the shunt capacitor 128. The effect is to cause the transistor 122 to draw less current when the load on the transistor 108 draws more current and vice versa, whereby the shunting action of the transistor 122 is decreased or increased depending on the instantaneous current requirements of the load 132 and 134, thus guaranteeing proper output voltage to the load irrespective of its resistance or reactance. Stating this operation in another manner, due to the action of the Zener diode 126 and its shunt capacitor 128, as the voltage on the collector of the transistor 108 goes down, the transistor 122 tends to cut off, whereby more current is available for the load 132 and 134. Conversely, as the voltage on the collector of the transistor 108 goes up, the transistor 122 tends to saturate whereby it drains current from the load 132 and 134. The resistance of the resistors 116 and 118 in series are chosen to provide the proper quiescent current for the transistors 108 and 122, while due to the shunting action of the capacitor 120, the resistor 118 alone comprises the AC collector load for the transistor 108. The current at the emitter of the transistor 108 corresponds to the vector 5 of FIG. 4. The capacitor 132 and the resistance 134 in series comprise a phase shift circuit applying a current to the emitter of the transistor 114 that corresponds to a desired vector such as the vector 6 or 7 in FIG. 4 depending on the setting of the capacitor 132.

The current flowing through the resistor 112 and through the resistor 134 combine at the emitter of the transistor 114 vectorially and without interaction therebetween. For neither current to effect the other, there may be no voltage change at the combination point of these currents comprising the emitter of the transistor 114. Since the base of the transistor 114 is kept at a constant voltage by the action of the broken down Zener diode 133 and since the transistor 114 never reaches cutoff and its emitter is kept at about seven-tenths of a volt higher than its base, the emitter of the transistor 114 cannot vary in voltage. Therefore, the current from the emitter of the transistor 96 is combined without interaction with the current derived from the selected portion of the signal voltage present at the collector of the transistor 96 and phase shifted by the variable capacitor 132 in series with the resistor 134. The signal increment at the emitter of the transistor 96 is equal in amplitude but opposite in polarity to the signal increment at the emitter of the transistor 108. However, basically, the ratio of the contribution of the signal increment at the emitter of the transistor 96 to the signal increment at the emitter of the transistor 108, as provided to the emitter of the transistor 114, is 1 to 2 because of the basic 1 to 2 ratio of the resistor 134 to the sum of the resistors 109 and 112. That is, the signal current vector arriving at the emitter of the transistor 114 from the emitter of the transistor 96 corresponds to a vector such as 8 or 8*a* or 8*b*, while the signal current vector arriving at the emitter of the transistor 114 from the junction of the emitter of the transistor 108 and the collector of the transistor 122 would correspond to the vector 5, assuming the reactance of the capacitor 132 to be negligibly small. However, the vector 5 is reduced in size and phase shifted by the differentiating action of the resistor 134 and the phasing capacitor 132 to produce a vector such as 6 or 7 of FIG. 4. The vectorial combination of the signal vector corresponding to a vector such as the vector 6 or 7 with a vector such as the vector 8*a* or 8*b* produces a vector such as 9 or 10. It will be noted that the size of the vector 9 or 10 is always equal to one-half of the vector 5 (even though the vector 5 varies), and that the phase relation between the vectors 9 or 10 and the vector 5 depends on the setting of the capacitor 132.

As has been pointed out, the diode 102 is back biased and does not pass signal currents below an amplitude corresponding to the nearly vertical portion of the curve 38 of FIG. 3. Below this value of amplitude of signal applied thereto, only the wave at the emitter of the transistor 96 gets through to the emitter of the transistor 114 and no phase shift is applied to this wave, whereby the current wave at the emitter of the transistor 114 now corresponds to a vector such as 8 of FIG. 4 and follows along the zero phase shift line of FIG. 3, since the voltage corresponding to the vector 5 is zero as long as the signal applied to the diode 102 does not overcome the back bias thereon. When the amplitude of the signal wave applied to the gate of the transistor 62 is great enough to overcome the back bias on the diode 102, the current wave applied to the emitter of the transistor 114 by way of the capacitor 132 and resistor 134 corresponds to a vector such as 6 or 7, depending on the setting of the capacitor 132, whereby the vectorial sums of the current waves at the emitter of the transistor 114 corresponds to a vector such as 9 or 10. It is noted that the combined current wave at the emitter of the transistor 114 is always directly proportional to the amplitude of the voltage applied to the gate of the transistor 62 and that its phase does not vary differentially for signal voltages below that required to overcome the back bias on a diode, and that for larger amplitudes of signal voltage the wave will suffer a differential phase shift determined by the setting of the capacitor 132 as indicated by the portion 38 *a* of the curve 38 of FIG. 3. The predistortion provided by the described phasing circuit and indicated by the curve 38, 38*a* of FIG. 3 when algebraically added to the inherent differential phase distortion present in the remainder of the transmitter circuit and indicated by the curve 36 provides a voltage wave whose differential phase distortion is less than it would be without the inclusion of the described phasing circuit. If the phase shift provided by the described coupling between the collector of the transistor 96 and the collector of the transistor 114 is not sufficient at the higher amplitudes of the luminance signal, another phasing system such as that shown and described may be connected between the collector of the transistor 96 and the emitter of the transistor 114, this other phasing system including another diode such as 102 adjusted to be back biased, as by manipulation of a slider on another potentiometer such as 106 and another low output impedance amplifier such as the amplifier comprising the transistor 108 and 122 and another phase shifting circuit such as the phase shifter comprising the capacitor 132 and the resistor 134. This additional circuit may be adjusted to provide a further phase shift as indicated by the curve 40 of FIG. 3 by manipulation of the potentiometer included therein, the further phase shift coming into effect at a higher amplitude point on the luminance signal corresponding to the vertical portion of the curve 40 of FIG. 3, whereby the algebraic sum of the inherent distortion curve 36 and the predistortion curves 38 and 40 would produce a lesser phase shift at the higher luminance amplitude than when only one phasing system is used. Furthermore, the capacitor 132 may be a voltage variable capacitor whose capacity increases with a voltage applied thereacross whereby the predistortion produced by one capacitor such as the capacitor 132 will be smoother in that the increase in phase provided by such a voltage variable capacitor would take the shape of a curve such as the dotted curve 41 of FIG. 3.

If the distortion produced in the system and the predistortion provided by the described differential phase distortion compensator are in the same direction, whereby they would add, the described predistortion circuit would not have the effect of reducing the differential phase distortion. This may be cured by reversing the diode 102. When the diode 102 is reversed, the phase of the wave appearing at the emitter of the transistor 114 would be shifted by the amount determined by the setting of the capacitor 132 up to the point where the now forward bias on the diode 102 is overcome by the signal at the collector of the transistor 96, see curve 43 of FIG. 4. For greater amplitudes of the signal the diode 102 would be open and the phase shift of the wave at these higher amplitudes appearing at the emitter of the transistor would be zero. It is seen that the algebraic sum of the curve 43 and a curve such as the curve 41, (which may represent the curve 36 reversed in phase) results in a wave whose phase is offset from zero but is more nearly uniform throughout its length than the wave whose phase changes in accordance with a curve such as the curve 41. Due to this phase offset, all waves controlling the color are now of incorrect phase, whereby another distortion called envelope delay distortion occurs when the diode 102 is reversed. However, a standard adjustment facility often provided in the equipment may be adjusted to correct for this envelope delay distortion, if it is of objectionable magnitude.

Most of the signal current flowing into the emitter of the transistor 114, which includes among other components, the vector 8, 9 or 10 and depends on the size of the input signal at the gate of the transistor 62 in amplitude and on the setting of the capacitor 132 in phase, flows out of the collector of the transistor 114 and is converted into voltage by flowing through the resistors 136 and 138 in parallel. As pointed out above since the DC component of the video signal which passes through the described differential phase compensator circuit is altered, only the AC component is used while the direct current component of the video signal passes through the resistor 150. For proper recombination of the DC and the AC components, their relative amplitude as applied to the gate of the transistor 62 must be restored. The variable resistor 138 is adjusted to the point where the differential phase compensator circuit provides unity amplification, whereby this relative amplitude is restored. The recombined signal appearing at the junction of the capacitor 140 and the adjacent contact of the switch 60 is applied to the modulator 144 for modulation of the carrier provided by the oscillator 146.

What I claim is:

1. A differential phase distortion compensator for color television equipment comprising:

means to provide video signal waves, means to provide second signal waves which are substantially half the amplitude of said video signal waves and which are substantially 180 degrees out of phase with respect to said video signal waves, amplitude threshold means for blocking waves of certain applied instantaneous amplitudes and for passing waves of other applied instantaneous amplitudes, means to apply said video signal waves to said threshold means, phase shifting means, means to apply waves passed by said amplitude threshold means to said phase shifting means, and means to combine vectorially said phase shifted video signal waves and said second signal waves, whereby said combined waves are of an amplitude determined by said video signal waves and whereby the phase of the combined waves varies at a predetermined value of amplitude thereof in a manner determined by said phase shift means.

2. The invention as expressed in claim 1 in which said means to produce said second signal waves comprises a phase splitter to which said video signal waves are applied.

3. The invention as expressed in claim 1 in which said means to combine said signals vectorially includes a connection point and means to keep said connection point at an unvarying voltage, whereby said signals combine vectorially but do not vary each other.

4. A differential phase distortion compensator for color television equipment comprising:

a phase splitter having an input terminal and two output terminals, a threshold device, a phase shifter, a connection point, means for keeping the connection point at an unvarying voltage, means to apply a video signal to the input terminal of said phase splitter, means to cause the ratio of amplitudes of the signals appearing at the two output terminals of said phase shifter to be substantially 2 to 1, means to apply the signal appearing at one of said output terminals of said phase splitter through said threshold device to said phase shifter, means to apply said phase shifted signal and said signal appearing at the other output terminal of said phase splitter to said connection point, and whereby said signals applied to said connection point combine vectorially and without interaction therebetween.

5. The invention as expressed in claim 4 in which said means to apply said signal to said phase splitter includes a high input impedance amplifier and in which said means to apply said signal to said phase shifter comprises a low output impedance amplifier.

6. The invention as expressed in claim 4 in which said connection point comprises the emitter of a transistor and in which said means for keeping the said connection point at an unvarying voltage comprises means for keeping the base of said transistor at a constant voltage.

7. The invention as expressed in claim 4 in which means are provided to shunt the DC component of said signal around said compensator and for adding said DC component to said vectorially added signals.

8. The invention as expressed in claim 4 in which means are provided to adjust a voltage corresponding to said vectorially added signals and in which means are provided to shunt the DC component of said signal around said compensator and for adding said DC component to said voltage corresponding to said vectorially added signals.